J. JACKSON.
ANIMAL TRAP.
APPLICATION FILED MAR. 10, 1909.
955,075.
Patented Apr. 12, 1910.
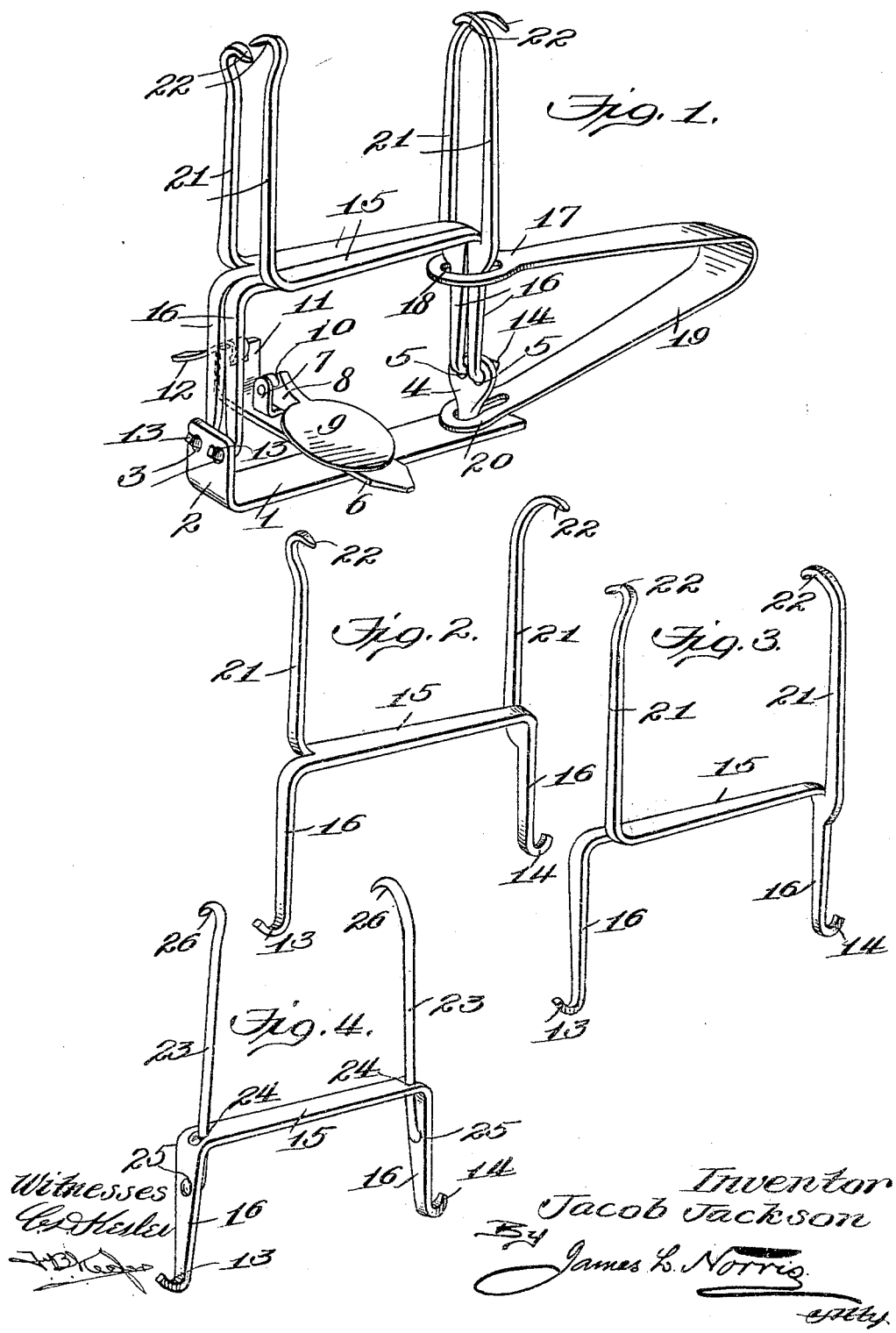

UNITED STATES PATENT OFFICE.

JACOB JACKSON, OF GREEN BAY, WISCONSIN.

ANIMAL-TRAP.

955,075.  Specification of Letters Patent.  Patented Apr. 12, 1910.

Application filed March 10, 1909. Serial No. 482,490.

*To all whom it may concern:*

Be it known that I, JACOB JACKSON, a citizen of the United States, residing at Green Bay, in the county of Brown and State of Wisconsin, have invented new and useful Improvements in Animal-Traps, of which the following is a specification.

This invention relates to an animal trap particularly adapted for catching small animals, such as mink and rabbits, and embodying spring jaws of a particular construction.

The primary object of the invention is to provide a strong and durable trap of simple and effective form and wherein each jaw has a dog or grapple carried thereby or forming an integral part thereof and adapted to be used on any form of trap with or without releasing triggers projecting above the trap.

The improved features will be more fully hereinafter referred to in connection with the accompanying drawings, wherein, Figure 1 is a perspective view of a trap embodying the features of the invention and showing the jaws closed. Figs. 2 and 3 illustrate detail perspective views of the jaws as shown by Fig. 1. Fig. 4 is a detail perspective view of a jaw showing a modication in the manner of applying the dogs or grapples.

In my pending application Serial Number 435,669, allowed September 30, 1908, a trap is disclosed adapted to be disposed in a stream of water and having elongated hooked jaws or grappling means and a trigger projecting upwardly between the jaws and having a head which, when struck by a swimming animal, releases the said jaws and results in a reliable engagement of the jaws with the animal. The features of the present invention may be applied to the trap disclosed by my pending application, above noted, or to any other trap now in use, and this improved trap essentially includes a pair of jaws provided with hooked extensions or dogs to render the trap doubly sure in catching the animal, either on land or in water.

The numeral 1 designates a base support having an upturned extremity 2 with a pair of openings 3 formed therein. The opposite end of the base has a post 4 rising therefrom and formed with a pair of openings 5 which transversely aline with the openings 3 in the upturned extremity 2 of the base support. Extending across the intermediate portion of the base support 1 in a plane at right angles to the latter is an auxiliary support 6 having a fulcrum clip 7 attached thereto for the reception of the end of the arm or shank 8 of a trip pan 9, said arm 8 being provided with an upper shoulder 10 for a purpose which will be presently explained. The one end of the auxiliary support 6 is upturned to provide an attaching terminal 11 for a latch 12 adapted to be thrown over and engage the shoulder 10 of the arm 8 to hold the parts of the trap in set condition, the trap being released, as will be readily understood, by depressing the pan 9 and disengaging the arm 8 from the latch 12. The pan 9 may also in some instances serve as a bait holding means in a manner which will be readily understood.

The terminals 13 and 14 of a pair of jaws 15 engage the openings 3 and 5 formed in the upwardly projecting extremity 2 and fulcrum post 4 respectively. The terminals 13 and 14 of the jaws 15 are bent outwardly and upwardly approximately in the form of hooks and are integral with the angular legs 16 of the jaws. Loosely engaging the pair of legs 16 adjacent to the fulcrum post 4 is a spring extremity 17 having an eye 18, the said spring extremity being a part of the usual form of spring 19 embodied in trap organizations and having the opposite extremity 20 held adjacent to the base support 1 by the fulcrum post 4.

The main feature of the invention consists in providing each jaw 15 with a pair of upwardly projecting dogs or grapples 21 terminating in upper hooked extremities 22, the dogs or grapples 21, as shown by Figs. 1, 2 and 3, being integrally formed with the jaws. The one dog or grapple 21 extends directly in a vertical plane from the horizontal portion of the jaw 15, and the other dog or grapple continues upwardly from the leg 16 at the opposite portion of each jaw. The dogs or grapples 21 of the two jaws 15 are in reverse positions and the hooked extremities 22 are also reversely directed so that the extremities of one pair of dogs or grapples will move past the similar extremities of the other pair of dogs or grapples when the jaws 15 are closed, as shown by Fig. 1.

In the modified form of the jaw 15 as shown by Fig. 4, wire dogs or grapples 23 are used and are inserted through openings 24 in the jaw bodies inside of the plane of the legs 16 and have their lower ends directed or bent outwardly and secured in openings 25 formed in said legs so as to thoroughly brace or reinforce the said dogs or grapples 23. The upper ends of the dogs or grapples 23 are bent to form hooks 26, the pairs of coöperating jaws 15 provided with the wire dogs or grapples 23 operating in all respects similar to the form of jaws and dogs or grapples illustrated by Figs. 1, 2 and 3.

The jaws 15 when set are opened and held by the latch 12 which is moved over one of the jaws and caught by or engaged with the shoulder 10 of the arm 8, the latter and the pan 9 being elevated between the open jaws. It will be understood that when the jaws are opened the spring 19 will be compressed, and when the pan 9 is depressed by the animal moving thereover or in taking the bait that may be disposed thereon, the jaws 15 are released and the spring 19 forcefully closes the jaws and traps the animal, the dogs or grapples carried by and moving with the jaws forming auxiliary means for insuring a positive trapping of the animal and in some instances the horizontal portions of the closed jaws 15 may grip one portion of the body of the animal and the dogs or grapples another portion of the body of the animal.

In applying the jaws 15 carrying the dogs or grapples as hereinbefore explained, only one practical embodiment of the invention is illustrated, and it is obvious that these jaws with the dogs or grapples may be used in any trap organization and the pan or trip means shown may be varied at will. The association of the dogs or grapples with the jaws not only provides a strong and durable construction, but is also economical from a standpoint of manufacture.

What is claimed is:

In a trap, the combination of a pair of gripping jaws each having a pair of grappling dogs fixed thereto and projecting therefrom, the jaws being U-shaped and having at least one of the grappling dogs extending from the horizontal members thereof, the grappling dogs being provided with straight shanks, and one dog at least of the pair of dogs of each jaw being located inwardly from one of the vertical jaw members, both dogs having inwardly bent hooked free terminals, and the hooked terminals of the pairs of dogs of both jaws having their open portions toward each other and the one set of hooked terminals closing inside of the other set, and means for causing the jaws to forcefully close.

In testimony whereof I have hereunto set my hand in presence of two subscribing witnesses.

JACOB JACKSON.

Witnesses:
E. A. JACKSON,
C. H. PETERSON.